(12) United States Patent
Okamura et al.

(10) Patent No.: US 9,805,746 B1
(45) Date of Patent: Oct. 31, 2017

(54) LOW MAGNETIC FLUX DENSITY INTERFACE LAYER FOR SPIN TORQUE OSCILLATOR

(71) Applicant: HGST Netherlands B.V., Amsterdam (NL)

(72) Inventors: Susumu Okamura, Machida (JP); Masashige Sato, Atsugi (JP); Keiichi Nagasaka, Isehara (JP); Yo Sato, Odawara (JP)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 15/195,876

(22) Filed: Jun. 28, 2016

(51) Int. Cl.
G11B 5/31 (2006.01)
G11B 5/147 (2006.01)
G11B 5/00 (2006.01)

(52) U.S. Cl.
CPC .......... G11B 5/3153 (2013.01); G11B 5/147 (2013.01); G11B 2005/0024 (2013.01)

(58) Field of Classification Search
CPC ................. G11B 5/3153; G11B 5/147; G11B 2005/0024
See application file for complete search history.

(56) References Cited

U.S. PATENT DOCUMENTS

| | | | |
|---|---|---|---|
| 8,064,244 B2 | 11/2011 | Zhang et al. | |
| 8,345,380 B2 * | 1/2013 | Sato | G11B 5/3133 360/110 |
| 8,537,497 B2 * | 9/2013 | Nagasaka | H01L 43/08 360/125.3 |
| 8,582,225 B2 * | 11/2013 | Shiimoto | G11B 5/02 360/324 |
| 8,773,822 B2 * | 7/2014 | Matsubara | G11B 5/3146 360/326 |
| 8,830,627 B2 * | 9/2014 | Sugiura | G11B 5/1278 360/125.3 |
| 8,854,768 B2 * | 10/2014 | Sugiura | G11B 5/3133 360/125.3 |
| 8,879,205 B2 | 11/2014 | Shiimoto et al. | |
| 8,953,282 B2 * | 2/2015 | Shiroishi | G11B 5/3909 360/110 |
| 8,970,996 B2 * | 3/2015 | Nagasaka | G11B 5/314 360/125.3 |
| 9,047,888 B2 | 6/2015 | Katada et al. | |
| 9,064,508 B1 | 6/2015 | Shiimoto et al. | |
| 9,099,115 B2 * | 8/2015 | Braganca | G11B 5/3143 |

(Continued)

OTHER PUBLICATIONS

Koga, R. et al., "Increase in AC-Field Frequency and Recording Performance in Microwave-Assisted Magnetic Recording," 2015 IEEE Magnetics Conference (INTERMAG), May 11, 2015, Beijing, China, 6 pages.

*Primary Examiner* — Brian Miller

(57) ABSTRACT

A magnetic field-assisted magnetic recording (MAMR) head is provided, which includes a recording main pole, a seed layer, and a spin torque oscillator (STO) positioned over the main pole, in this order, in a stacking direction from a leading side to a trailing side of the recording head. The STO comprises a spin polarized layer (SPL), an interlayer with fcc structure, and a field generating layer (FGL), in this order in the stacking direction. The FGL comprises a low magnetic flux density interface (LMFDI) layer with bcc structure that directly contacts the interlayer.

22 Claims, 9 Drawing Sheets

FGL = FIELD GENERATING LAYER
SPL = SPIN POLARIZED LAYER
STO = SPIN TORQUE OSCILLATOR
MP = MAIN POLE

(56) References Cited

U.S. PATENT DOCUMENTS

| | | | |
|---|---|---|---|
| 9,129,635 B2 * | 9/2015 | Fukuda | G11B 5/78 |
| 9,208,801 B2 | 12/2015 | Zhang et al. | |
| 9,230,569 B1 | 1/2016 | Shimoto et al. | |
| 9,230,597 B2 | 1/2016 | Shimoto et al. | |
| 2012/0069465 A1 * | 3/2012 | Sato | G11B 5/3133 |
| | | | 360/77.02 |
| 2014/0104724 A1 * | 4/2014 | Shiroishi | G11B 5/66 |
| | | | 360/75 |
| 2015/0228295 A1 | 8/2015 | Shiimoto et al. | |

* cited by examiner

FGL = FIELD GENERATING LAYER
SPL = SPIN POLARIZED LAYER
STO = SPIN TORQUE OSCILLATOR
MP = MAIN POLE

FGL = FIELD GENERATING LAYER
SPL = SPIN POLARIZED LAYER
STO = SPIN TORQUE OSCILLATOR
MP = MAIN POLE

FGL = FIELD GENERATING LAYER
SPL = SPIN POLARIZED LAYER
STO = SPIN TORQUE OSCILLATOR
MP = MAIN POLE

| Interface Layer Material | t1 | t2 | t3 | Bs x Thickness of SPL (B$_{st}$) (T nm) | Interface Layer (B$_s$) (T) | Interface Layer (P) (%) | SPL flip bias voltage (Vjump) (mV) |
|---|---|---|---|---|---|---|---|
| Co-Fe | 5 | 25 | 8 | 3.9 | 2.4 | 0.50 | 45 |
| Co-Fe-Al | 5 | 25 | 9 | 4.1 | 1.2 | 0.52 | 30 |
| Co-Fe | 10 | 25 | 2 | 4.4 | 2.4 | 0.50 | 35 |
| Co-Fe-Al | 10 | 25 | 4 | 4.3 | 1.2 | 0.52 | 20 | t1 = thickness of SPL interface layer (Å)
t2 = thickness of SPL Heusler layer (Å)
t3 = thickness of SPL top CoFe layer (Å)

FIG. 8

PERIODIC TABLE

| | | | | | | | | | | | | | | | | | He |
|---|---|---|---|---|---|---|---|---|---|---|---|---|---|---|---|---|---|
| H | | | | | | | | | | | | | | | | | Ne |
| Li | Be | | | | | | | | | | | B | C | N | O | F | Ar |
| Na | Mg | | | | | | | | | | | Al | Si | P | S | Cl | Kr |
| K | Ca | Sc | Ti | V | Cr | Mn | Fe | Co | Ni | Cu | Zn | Ga | Ge | As | Se | Br | Xe |
| Rb | Sr | Y | Zr | Nb | Mo | Tc | Ru | Rh | Pd | Ag | Cd | In | Sn | Sb | Te | I | Rn |
| Cs | Ba | La | Hf | Ta | W | Re | Os | Ir | Pt | Au | Hg | Tl | Pb | Bi | Po | At | |

Group Y — (Cr, Mn) circled
Group X — (Fe, Co) circled (dashed)
Group Z — (Al) circled

LOW MAGNETIC FLUX DENSITY INTERFACE LAYER FOR SPIN TORQUE OSCILLATOR

BACKGROUND

The present invention relates to a magnetic recording head having a function for inducing magnetization reversal by applying a high-frequency magnetic field to a magnetic recording medium, and to a magnetic recording and reproduction device.

In order to achieve higher recording densities for a magnetic recording head mounted in a hard disk device, it is necessary to narrow the width and pitch of write tracks, and thus correspondingly narrow the magnetically recorded bits encoded in each write track. One challenge in narrowing the width and pitch of write tracks is decreasing a surface area of a main pole of the magnetic recording head at an air bearing surface of the recording media. Specifically, as the main pole becomes smaller, the recording field becomes smaller as well, limiting the effectiveness of the magnetic recording head, and at some degree of miniaturization, with prior technology it is no longer possible to achieve a recording field sufficient to effectively record magnetic information into the media with such a conventional recording head. One prior technology that has been proposed to address this issue is a high-frequency magnetic field-assisted recording method (MAMR: microwave-assisted magnetic recording), in which a spin torque oscillator (STO) is formed on the main pole, and a high-frequency magnetic field is applied to the recording medium in order to reduce the coercive force of the medium, and in this state, a recording field is applied to the medium in order to record data. Heusler alloys have been incorporated into the field generating layer (FGL) and spin polarized layer (SPL) of the STO, thereby achieving high spin polarization (P) and relatively low saturation magnetic flux density (Bs) which are associated with high spin torque efficiency.

One challenge with spin torque oscillators is that it is difficult to manufacture them to have a high spin torque efficiency. One factor that can negatively affect spin torque efficiency is defects in the crystal structure of the Heusler alloy in the spin polarized layer (SPL) and/or field generating layer (FGL) of the STO, especially when crystallizing the Heusler alloy in a Heusler layer above an interlayer with fcc structure. Conventional MAMR heads have addressed this problem by configuring a thick enough interface CoFe layer with bcc structure between the interlayer and the Heusler alloy in the Heusler layer. Although the thick interface CoFe layer promotes proper crystalline growth for the Heusler layer, the high magnetic flux density of the interface CoFe layer also compromises spin torque efficiency. When the interface CoFe layer is thin, the initial part of the Heusler layer creates a magnetic dead layer within the Heusler alloy that also contributes to lowered spin torque efficiency by reducing the functional thickness of the Heusler layer.

SUMMARY

To address these issues, a magnetic field-assisted magnetic recording (MAMR) head is provided, which includes a recording main pole, a seed layer, and a spin torque oscillator (STO) positioned over the main pole, in this order, in a stacking direction from a leading side to a trailing side of the recording head. The STO comprises a spin polarized layer (SPL), an interlayer with fcc structure, and a field generating layer (FGL), in this order in the stacking direction. The FGL comprises a low magnetic flux density interface (LMFDI) layer with bcc structure that directly contacts the interlayer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The present disclosure is illustrated by way of example and not by way of limitation in the figures of the accompanying drawings, in which like reference numerals indicate like elements and in which:

FIG. 8 is a table with experimental examples illustrating the spin torque oscillator properties resulting from various structural configurations of the interface layer, Heusler layer, and top CoFe layer, with reference to the conventional FGL-down-type MAMR head and the first embodiment of the present disclosure; and FIG. 9 is a periodic table illustrating the elements X, Y, and Z in the alloy of the interface layer comprising X-Y-Z according to the first and second embodiments of the present disclosure.

DETAILED DESCRIPTION

Introduction

Figure 1:
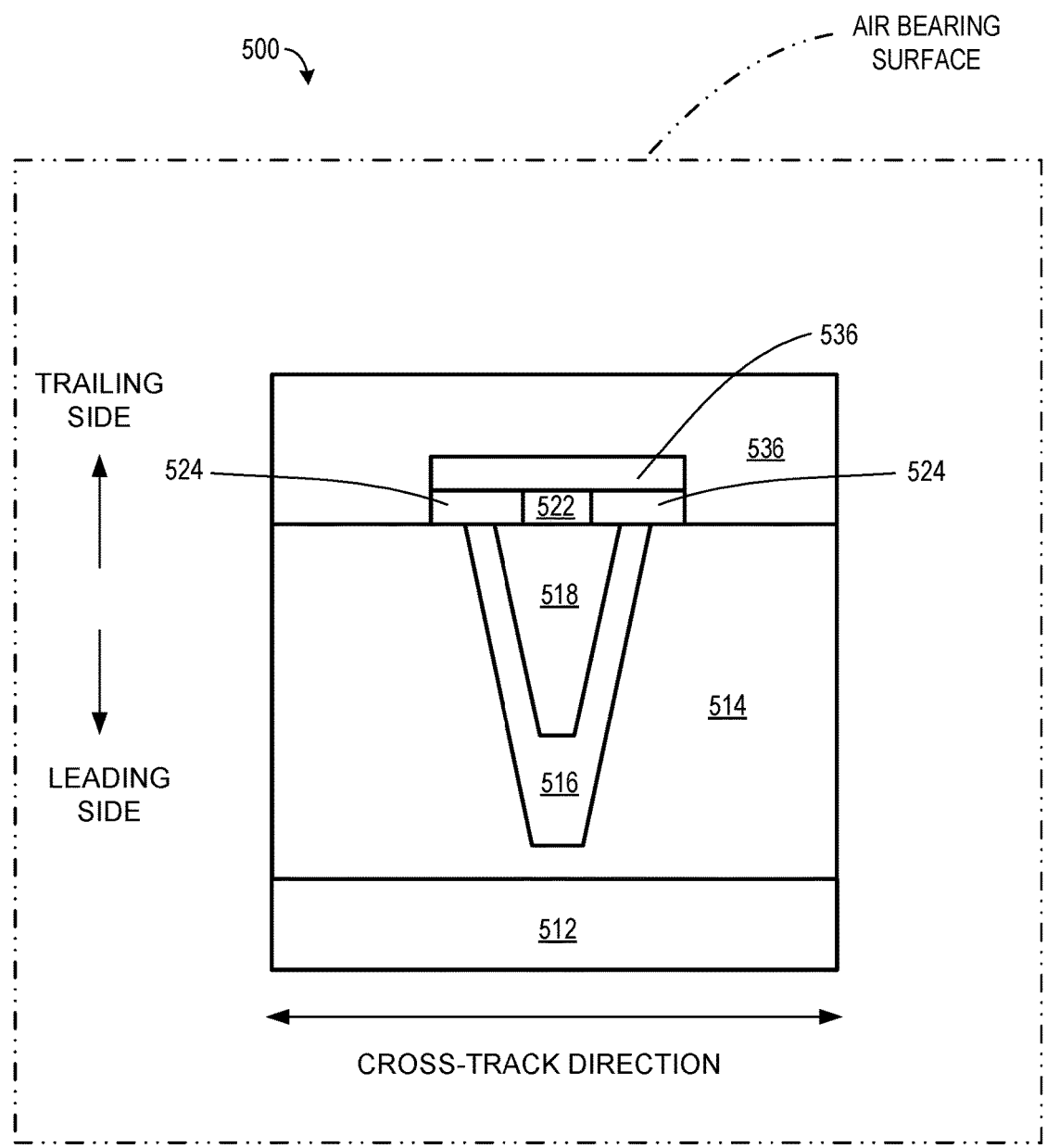
FIG. 1 is a plan view of an air bearing surface of a conventional MAMR magnetic recording head.

Referring to FIG. 1, a plan view of an air bearing surface (ABS) of a conventional MAMR magnetic recording head 500 is shown. The MAMR magnetic recording head 500 comprises a main pole 518 adapted for producing a writing magnetic field, a spin torque oscillator (STO) 522 that is positioned on the main pole 518, a trailing gap 524 positioned on the sides of the STO 522, a trailing shield 536 positioned on the trailing gap 524 and the STO 522 on a trailing side of the main pole 518, a side shield 514 positioned on at least on side of the main pole 518 in a cross-track direction and set on a substrate 512, and a side gap 516 positioned between the side shield 514 and the main pole 518. During manufacturing, the main pole 518 is typically plated on top of the side gap 516 in a trench configuration. The main pole 518 is configured to emit a recording magnetic field for affecting a magnetic medium, the main pole 518 serving as an electrode and having a front portion at the ABS. The main pole 518 typically comprises small grain CoFe or CoFeNi in a random crystalline orientation. The trailing shield 536 is a magnetic film serving as an electrode, positioned over a trailing side surface of the main pole 518. The side gap 516 is typically a non-magnetic film. The STO 522 that is positioned on the main pole 518 generates a high frequency magnetic field on the magnetic medium, thereby reducing the coercive force of the medium, so that smaller recording fields can be used to record data. The STO 522 may be configured as one of two types: a FGL-top type (depicted in FIG. 2) or a FGL-down-type (depicted in FIG. 3).

Figure 2:
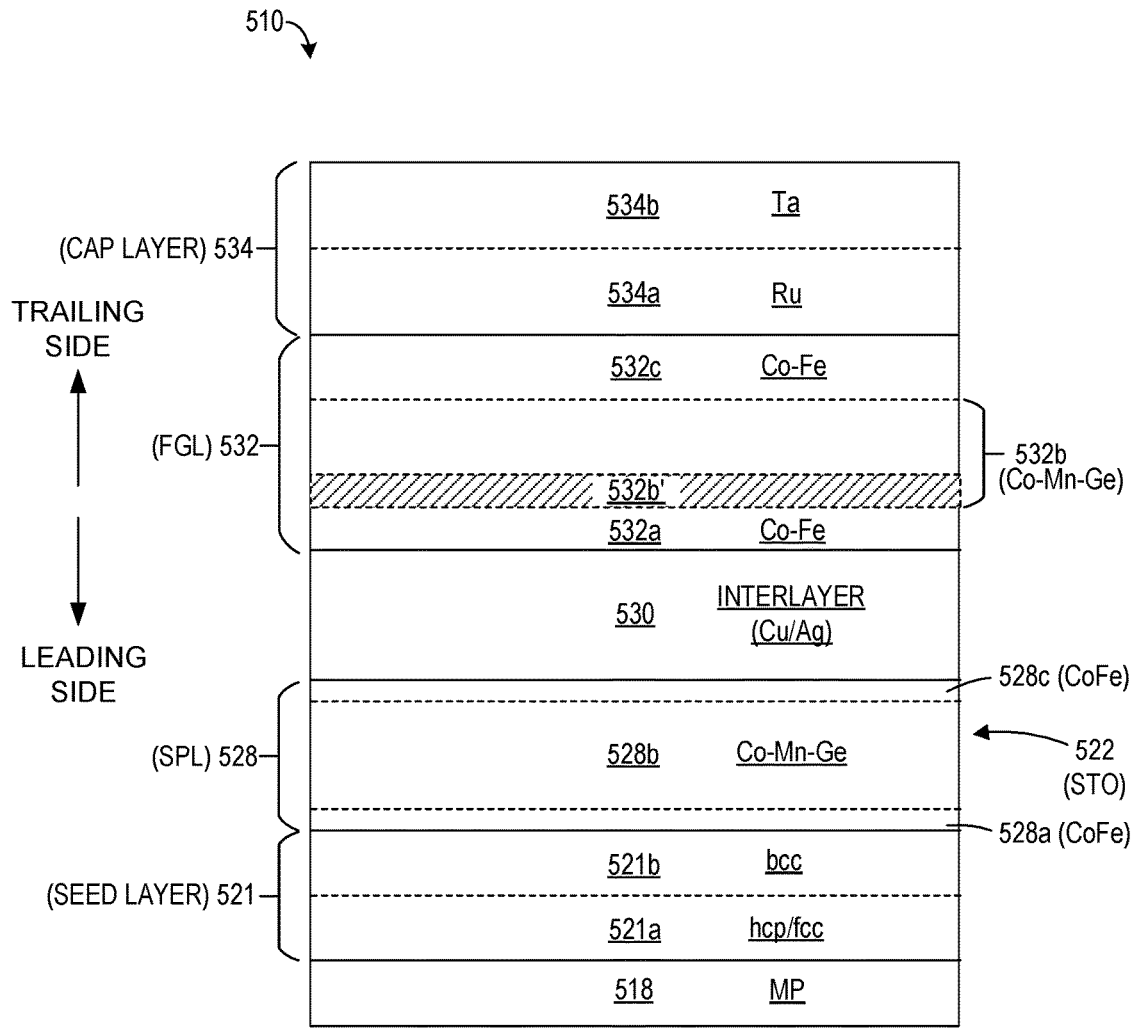
FIG. 2 is a detailed plan view of an air bearing surface of a conventional MAMR magnetic recording head of the FGL-top-type.

Turning to FIG. 2, a magnified, detailed plan view of an air bearing surface of a conventional MAMR head 510 is shown configured as the FGL-top-type. For the sake of brevity, the trailing gap and the layers above the cap layer 534 have been omitted in this view. Positioned over the main pole 518 are a seed layer 521, and a STO 522, which comprises a spin polarizing layer (SPL) 528 and field generating layer (FGL) 532 with an interlayer 530 in between, and a cap layer 534 in this order, in a stacking direction from the leading side to the trailing side of the recording head 510. The seed layer 521 comprises an hcp or fcc layer 521a and a bcc layer 521b, in this order, which aid the proper crystalline growth of the SPL 528. The bcc layer 521b may comprise NiAl or Cr, the fcc layer 521a may comprise Pt, and the hcp layer 521a may comprise Ru, for example. The SPL 528 comprises a Heusler layer 528b sandwiched between an interface CoFe layer 528a and a top CoFe layer 528c in a Hi—O (Heusler alloy) type configuration. The interlayer 530 may comprise a Cu or Ag layer, 15 to 35 Å thick, and may have an fcc structure. The FGL 532 comprises a Heusler layer 532b sandwiched between an interface CoFe layer 532a and a top CoFe layer 532c in a Hi—P (Heusler alloy) type configuration, where the interface layer 532a is 4 to 10 Å thick and the Heusler layer 532b is 10 to 30 Å thick. Although the Heusler layer is depicted here as Co—Mn—Ge (CMG) layer, it will be appreciated that the Heusler layer 532b may alternatively comprise other Heusler alloys with the chemical formula of X-Y-Z, where element Z is Si or Ge. Within the Heusler layer 532b adjacent to the interface CoFe layer 532a is a magnetic dead layer 532b', which does not contribute to the magnetic volume of the FGL 532 due to the highly frustrated nature of the magnetic couplings in the magnetic dead layer 532b', consequently reducing the functional thickness of the Heusler layer 532b and leading to the degradation of the ferromagnetism of the STO 522. The cap layer 534 may comprise a Ru layer 534a, and a Ta layer 534b, in this order, where the Ru layer 534a may be 15 to 25 Å thick, and the Ta layer 534b may be 15 to 25 Å thick.

Figure 3:
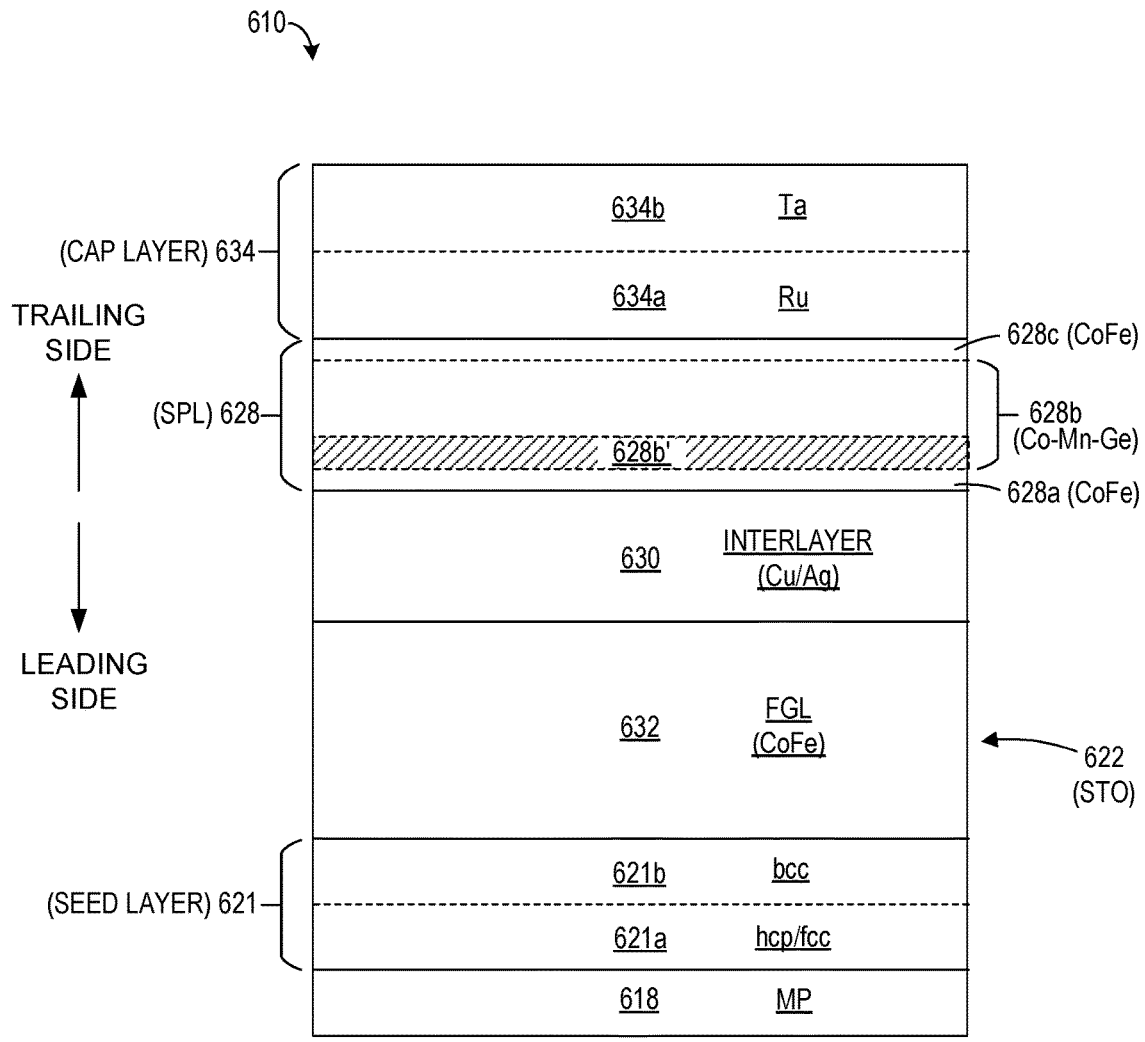
FIG. 3 is a detailed plan view of an air bearing surface of a conventional MAMR magnetic recording head of the FGL-down-type.

Likewise, turning to FIG. 3, a magnified, detailed plan view of an air bearing surface of a conventional MAMR head 610 is shown configured as the FGL-down type. Since the conventional MAMR head 610 of the FGL-down-type is generally similar to the conventional MAMR head 510 of the FGL-top-type with the exception of the orientations of the FGL and SPL, the detailed description thereof is abbreviated here for the sake of brevity. It is to be noted that like parts are designated by like reference numerals throughout the detailed description and the accompanying drawings. Positioned over the main pole 618 are a seed layer 621 and a STO 622, which comprises a FGL 632 and SPL 628 with an interlayer 630 in between, and a cap layer 634 in this order, in a stacking direction from the leading side to the trailing side of the recording head 610. The seed layer 621 comprises an hcp or fcc layer 621a and a bcc layer 621b, in this order, which aid the proper crystalline growth of the FGL 632. The FGL 632 may comprise a CoFe layer, which may be 45 to 55 Å thick. The SPL 628 comprises a Heusler layer 628b sandwiched between an interface CoFe layer 628a and a top CoFe layer 628c in a Hi—P (Heusler alloy) type configuration, where the interface layer 628a is 4 to 10 Å thick and the Heusler layer 628b is 10 to 30 Å thick. The Heusler layer 628b may alternatively comprise other Heusler alloys with the chemical formula of X-Y-Z, where element Z is Si or Ge. Within the Heusler layer 628b adjacent to the interface CoFe layer 628a is a magnetic dead layer 628b', which does not contribute to the magnetic volume of the SPL 628 due to the highly frustrated nature of the magnetic couplings in the magnetic dead layer 628b', consequently reducing the functional thickness of the Heusler layer 628b and leading to the degradation of the ferromagnetism of the STO 622.

As described above, the SPL in FGL-down-type MAMR heads and FGL in FGL-top-type MAMR heads are characterized by magnetic dead layers, which may reach a thickness between 5 and 10 Å when the interface CoFe layer is between 4 and 6 Å thick, thereby compromising the spin torque efficiency of conventional MAMR heads. Consequently, the resulting SPL layer that grows on top of the interlayer often has frustrated magnetic couplings that contribute to lowered spin torque efficiency. The interface CoFe layer itself also contributes to lowered spin torque efficiency due to its high magnetic flux density.

In view of the above described problems with conventional MAMR heads, a selected embodiment of the present invention will now be described with reference to the accompanying drawings. It will be apparent to those skilled in the art from this disclosure that the following description of an embodiment of the invention is provided for illustration only and not for the purpose of limiting the invention as defined by the appended claims and their equivalents.

LMFDI Interface Layer

Figure 4:
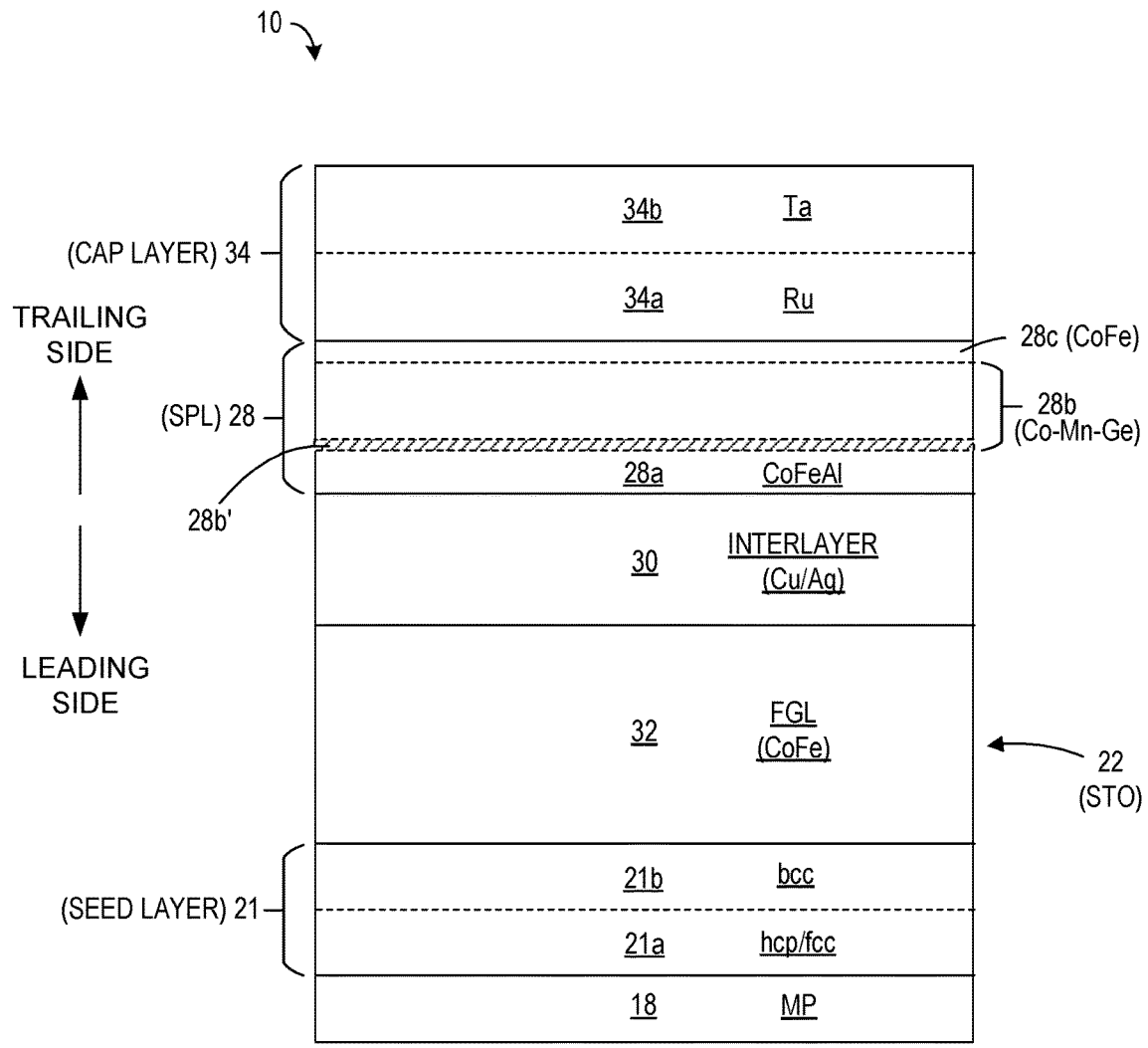
FIG. 4 is a detailed plan view of an air bearing surface of a MAMR magnetic recording head according to a first embodiment of the present disclosure.

Referring to FIG. 4, a detailed plan view of an air bearing surface of a MAMR magnetic recording head 10 is shown according to a first embodiment of the present disclosure. Since the MAMR head 10 of the FGL-down-type is generally similar to the conventional MAMR head 610 of the FGL-down-type with the exception of the interface layer 28a in the SPL 28 and the magnetic dead layer 28b' in the Heusler layer 28b, the detailed description thereof is abbreviated here for the sake of brevity. It is to be noted that like parts are designated by like reference numerals throughout the detailed description and the accompanying drawings. In the first embodiment, the MAMR head 10 comprises a recording main pole 18, a seed layer 21 and a STO 22 positioned over the main pole 18, in this order in a stacking direction from a leading side to a trailing side of the recording head 10. The STO 22 comprises a FGL 32, an interlayer 30 with fcc structure, and a SPL 28, in this order in the stacking direction. The SPL 28 comprises a low magnetic flux density interface (LMFDI) layer 28a that interfaces with the interlayer 30. The LMFDI layer 28a may comprise an alloy X-Y-Z comprising element X, element Y, and element Z, where X is selected from a group consisting of Co and Fe, Y is selected from a group consisting of Cr, Mn, Fe, and Co, and Z is Al. In this embodiment, the LMFDI layer 28a comprises an alloy of Co—Fe—Al, but it may alternatively be an alloy Co—Mn—Al, for example. The material of the LMFDI layer 28a has a bcc structure with high spin polarization, which improves spin torque efficiency and increases the strength of the high frequency magnetic field generated by the STO 22.

The SPL 28 further comprises a Heusler layer 28b directly contacting the LMFDI layer 28a, the Heusler layer 28b comprising a different material from the LMFDI layer 28a, and the Heusler layer 28b further comprises a magnetically unresponsive magnetic dead layer 28b' that directly contacts the LMFDI layer 28a. The Heusler layer 28b comprises an alloy X-Y-Z comprising element X, element Y, and element Z, where X is selected from a group consisting of Co and Fe, Y is selected from a group consisting of Cr, Mn, Fe, and Co, and Z is selected from a group consisting of Si and Ge. Accordingly, the Heusler layer 28b may comprise an alloy Co—Mn—Ge, for example. The LMFDI layer 28a also improves spin torque efficiency by ordering the magnetic couplings in the Heusler layer 28b, thereby reducing the thickness of the magnetic dead layer 28b' which degrades the ferromagnetism of the Heusler layer 28b. Therefore, the magnetic dead layer 28b' of the first embodiment has a significantly reduced thickness compared to the magnetic dead layer 628b' of the conventional FGL-down type MAMR head 610.

Figure 5:
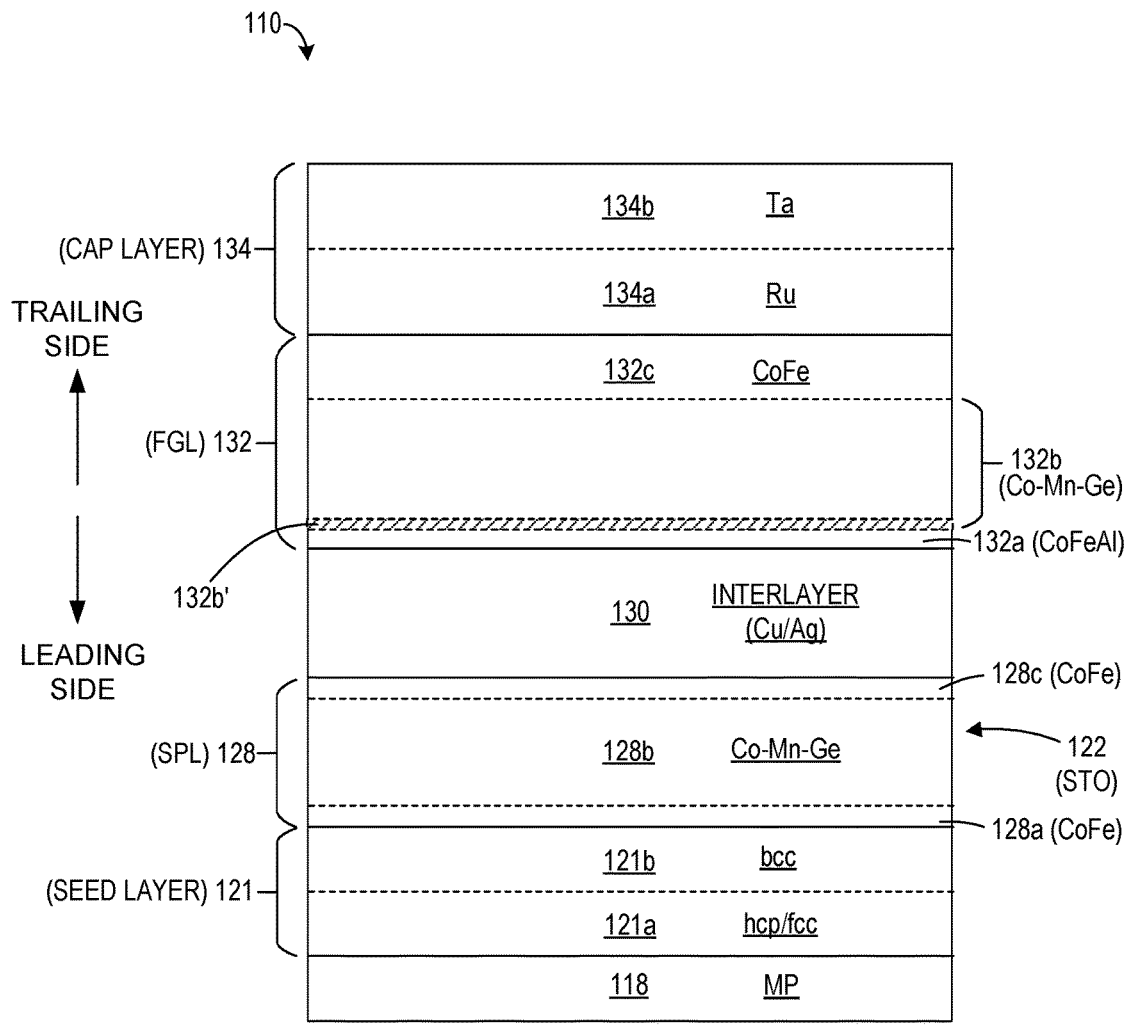
FIG. 5 is a detailed plan view of an air bearing surface of a MAMR magnetic recording head according to a second embodiment of the present disclosure.

Referring to FIG. 5, a detailed plan view of an air bearing surface of a MAMR head 110 is shown according to a second embodiment of the present disclosure. Since the MAMR head 110 of the FGL-top-type is generally similar to the conventional MAMR head 510 of the FGL-top-type with the exception of the interface layer 132a in the FGL 132 and the magnetic dead layer 132b' in the Heusler layer 132b, the detailed description thereof is abbreviated here for the sake of brevity. It is to be noted that like parts are designated by like reference numerals throughout the detailed description and the accompanying drawings. In the second embodiment, the MAMR head 110 comprises a recording main pole 118, a seed layer 121, and a STO 122 positioned over the main pole 118, in this order in a stacking direction from a leading side to a trailing side of the recording head. The STO 122 comprises a SPL 128, an interlayer 130 with fcc structure, and a FGL 132, in this order in the stacking direction. The FGL 132 comprises a low magnetic flux density interface (LMFDI) layer 132a that interfaces with the interlayer 130. Since the material composition of the LMFDI layer 132a and the Heusler layer 132b of the second embodiment are similar to those of the first embodiment (LMFDI layer 28a and Heusler layer 28b), the detailed description thereof is abbreviated here for the sake of brevity. Like the first embodiment, the magnetic dead layer 132b' is reduced in thickness by the LMFDI layer 132a, which has a bcc structure with high spin polarization that orders the magnetic couplings in the Heusler layer 132b to improve the spin torque efficiency of the STO 122.

Figure 6:
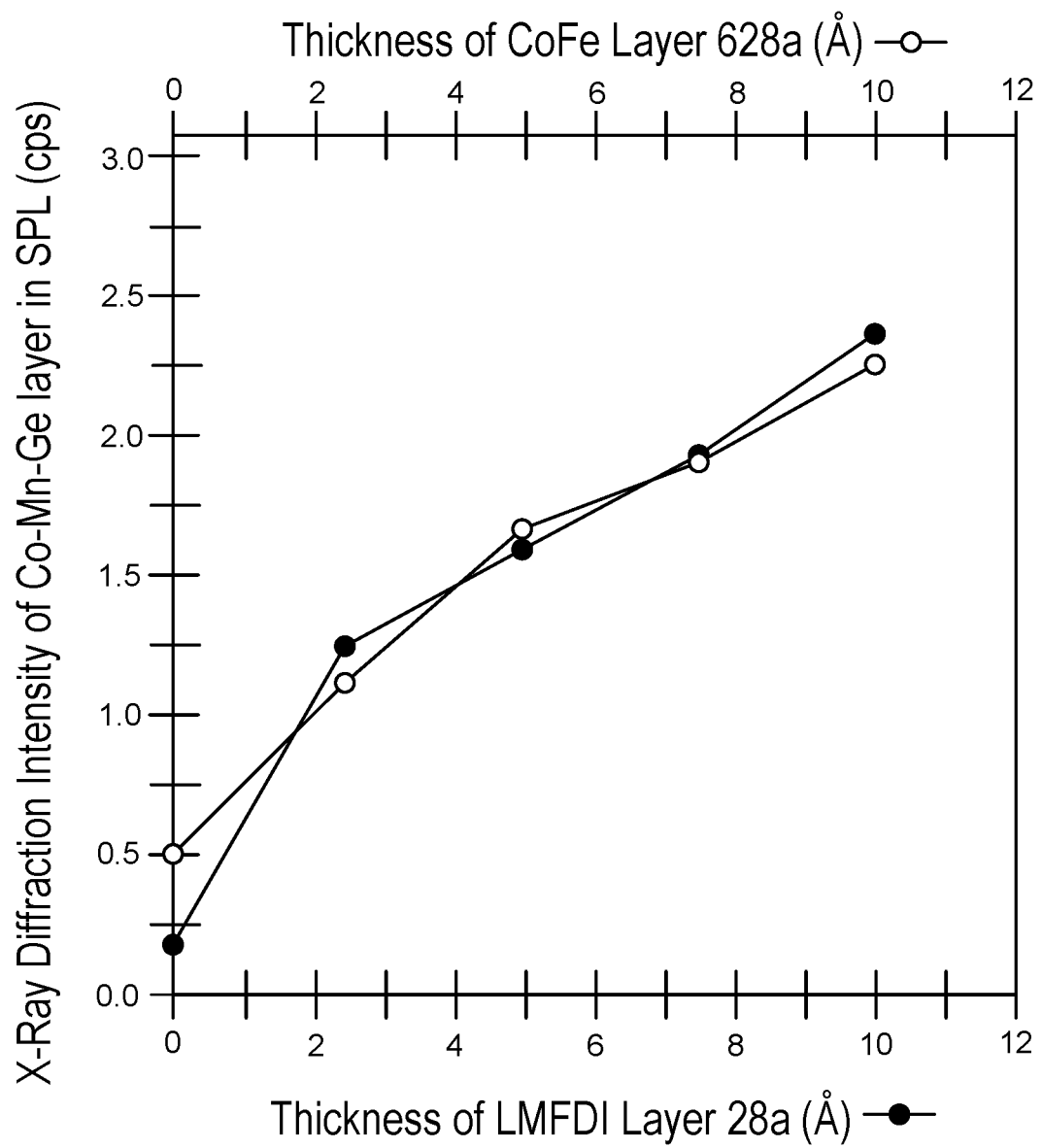
FIG. 6 is a plot illustrating the relationship between the X-ray diffraction intensity of the Heusler layer and the thickness of the interface layer between the interlayer and the Heusler layer, with reference to the conventional FGL-down-type MAMR head and the first embodiment of the present disclosure.

Referring to FIG. 6, a plot is shown illustrating the relationship between the X-ray diffraction intensity of a Heusler layer, configured as a Co—Mn—Ge layer, and the thickness of the interface layer between the interlayer and the Heusler layer, with reference to the conventional FGL-down-type MAMR head and the first embodiment of the present disclosure. The inventors have conducted experiments to measure the X-ray diffraction intensity of the Heusler layer 28b in the STO 22 of the first embodiment at various thicknesses of the interface layer 28a, and measure the X-ray diffraction intensity of the Heusler layer 628b in the STO 622 of the FGL-down type conventional MAMR head 610 at various thicknesses of the conventional interface layer 628a. Higher X-ray diffraction intensity corresponds to higher levels of crystallization with higher spin torque efficiency. It is demonstrated that the X-ray diffraction intensity of the Heusler layer 28b of the first embodiment is comparable to that of the Heusler layer 128b of the conventional FGL-down type MAMR head 610, suggesting that good crystalline growth of the Heusler layer 28b is maintained even when the LMFDI layer 28a is configured in the SPL 28 instead of the conventional CoFe interface layer. It will be appreciated that similar X-ray diffraction intensity results are to be expected for the Heusler layer 132b of the second embodiment in the FGL-top type MAMR head 110.

Figure 7:
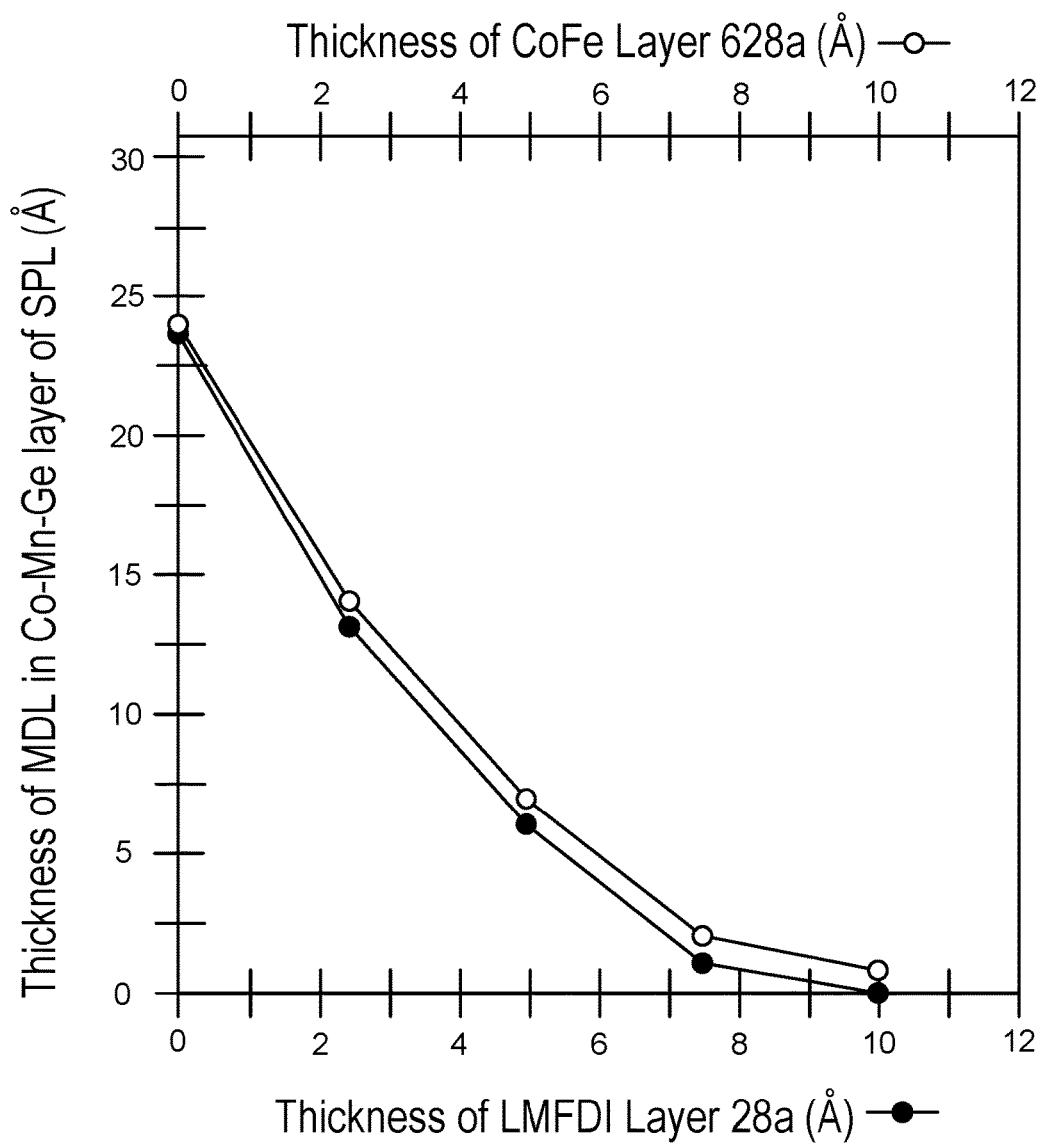
FIG. 7 is a plot illustrating the relationship between the thickness of the magnetic dead layer in the Heusler layer of the spin polarized layer (SPL) and the thickness of the interface layer between the interlayer and the Heusler layer, with reference to the conventional FGL-down-type MAMR head and the first embodiment of the present disclosure.

Turning to FIG. 7, a plot is shown illustrating the relationship between the thickness of the magnetic dead layer in a Heusler layer, configured as a Co—Mn—Ge layer, of the spin polarized layer (SPL) and the thickness of the interface layer between the interlayer and the Heusler layer, with reference to the conventional FGL-down-type MAMR head and the first embodiment of the present disclosure. The inventors have conducted experiments to measure the thickness of the magnetic dead layer 28b' in the Heusler layer 28b in the STO 22 of the first embodiment at various thicknesses of the interface layer 28a, and measure the thickness of the magnetic dead layer 628b' in the Heusler layer 628b in the STO 622 of the conventional FGL-down type MAMR head 610 at various thicknesses of the conventional interface layer 628a. The thickness of the magnetic dead layer may be calculated by evaluating thickness-dependence of the Heusler layer at various thickness of the interface layer to determine the thickness of the magnetic dead layer based on the measured slope and intercept of saturation magnetization versus thickness of the Heusler layer. As shown in this Figure, the magnetic dead layer reaches a thickness between 5 and 10 Å when the conventional interface CoFe layer is between 4 and 6 Å thick. On the other hand, it is demonstrated that a significant reduction in the thickness of the magnetic dead layer is achieved by configuring the interface layer to be a LMFDI layer, and a thickness of the LMFDI layer between 7.5 and 10 Å has practical application in improving spin torque efficiency by ordering the magnetic couplings in the Heusler layer, thereby reducing the thickness of the magnetically unresponsive magnetic dead layer to less than 5 Å.

Referring to the table in FIG. 8, the magnetic flux density Bs of the interface layer (T), the product Bst of Bs and the thickness of the SPL (T nm), the spin polarization P of the interface layer (%), and the SPL flip bias voltage Vjump (mV) are shown for various configurations of the SPL in the FGL-down type MAMR head 10 and the conventional FGL-down type MAMR head 610 at various thickness of the interface layer (t1), the Heusler layer (t2), and the top CoFe layer (t3). For each experimental example, the spin torque efficiency of the SPL was assumed to be inversely proportional to the SPL flip bias voltage Vjump (mV), which was determined by experimentally applying a variable bias voltage to the STO to determine the voltage at which STO resistance experiences a rapid change. The experimental evidence suggests that the LMFDI layer (Co—Fe—Al layer) consistently achieves lower magnetic flux densities than the conventional interface layer (Co—Fe layer) and consequently achieves comparable spin polarizations and higher spin torque efficiencies for the STO than conventional interface layers at comparable thicknesses. The elevated spin torque efficiencies at larger thicknesses of the interface layer are also believed to be the result of the reduction in the thicknesses of the magnetic dead layer in the Heusler layer and the resulting increase in the functional thicknesses of the Heusler layer.

Referring to FIG. 9, the locations of elements X, Y, and Z in the alloy of LMFDI layer 28a or 128a comprising X-Y-Z are illustrated in the periodic table, which lists each element. The LMFDI layer 28a or 128a comprises an alloy X-Y-Z comprising element X, element Y, and element Z, where element X is selected from a group consisting of Co and Fe, element Y is selected from a group consisting of Cr, Mn, Fe, and Co, and element Z is Al. In general, Heusler alloys are advantageous for use as an interface layer due to their high spin polarization properties. The inventors have conducted experiments to evaluate various candidate Heusler alloys for use as an interface layer in the STO of the MAMR head. The candidate Heusler alloys that were experimentally evaluated were various alloys with the formula X-Y-Z comprising transition metal X, transition metal Y, and element Z, where transition metal X was selected from a group consisting of Fe, Co, Ni and Cu, transition metal Y was selected from a group consisting of Ti, V, Cr, Mn, Fe, and Co, and element Z was selected from a group consisting of Al, Si, Ga, Ge, and Sn. However, experimental results indicated that only the Heusler alloys with element Z consisting of Al was capable of functioning as a suitable LMFDI layer that can crystallize on an interlayer with fcc structure at relatively low annealing temperatures (at 150° C., for example).

According to the present disclosure as described above, embodiments of a MAMR head are provided to improve the spin torque efficiency of the spin torque oscillator by configuring a low magnetic flux density interface layer between the Heusler layer and the interlayer. The lower magnetic flux density of the interface layer, as well as its high spin polarization, achieves good crystalline growth for the Heusler layer and reduces the magnetic dead volume within the Heusler layer, so as to increase the functional thickness of the Heusler layer that improves the efficiency of the spin torque oscillator compared to conventional MAMR heads.

It will be understood that the configurations and/or approaches described herein are exemplary in nature, and that these specific embodiments or examples are not to be considered in a limiting sense, because numerous variations are possible.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A magnetic field-assisted magnetic recording (MAMR) head comprising:
   a recording main pole; and
   a seed layer and a spin torque oscillator (STO) positioned over the main pole, in this order in a stacking direction from a leading side to a trailing side of the recording head, wherein
   the STO comprises a spin polarized layer (SPL), an interlayer with fcc structure, and a field generating layer (FGL), in this order in the stacking direction, and
   the FGL comprises at least three different magnetic materials, including a low magnetic flux density interface (LMFDI) layer with bcc structure that directly contacts the interlayer.

2. The MAMR head of claim 1, wherein
   the LMFDI layer comprises an alloy X-Y-Z comprising element X, element Y, and element Z, wherein
   X is selected from a group consisting of Co and Fe,
   Y is selected from a group consisting of Cr, Mn, Fe, and Co, and
   Z is Al.

3. The MAMR head of claim 1, wherein
   the LMFDI layer comprises an alloy Co—Fe—Al.

4. The MAMR head of claim 1, wherein
   the LMFDI layer has a thickness of 7.5 to 10 Å.

5. The MAMR head of claim 1, wherein
   the FGL further comprises a Heusler layer directly contacting the LMFDI layer, the Heusler layer comprising a different material from the LMFDI layer, and the Heusler layer further comprises a magnetically unresponsive magnetic dead layer that directly contacts the LMFDI layer.

6. The MAMR head of claim 5, wherein
   the magnetic dead layer has a thickness of less than 5 Å.

7. The MAMR head of claim 5, wherein
   the Heusler layer comprises an alloy X-Y-Z comprising element X, element Y, and element Z, wherein
   X is selected from a group consisting of Co and Fe,
   Y is selected from a group consisting of Cr, Mn, Fe, and Co, and
   Z is selected from a group consisting of Si and Ge.

8. The MAMR head of claim 7, wherein
   the Heusler layer comprises an alloy Co—Mn—Ge.

9. The MAMR head of claim 1, wherein
   the seed layer comprises a bcc layer positioned above an hcp layer or fcc layer.

10. The MAMR head of claim 1, wherein the FGL comprises the LMFDI layer, a Heusler layer directly contacting the LMFDI layer, and a CoFe layer directly contacting the Heusler layer.

11. The MAMR head of claim 1, wherein
    the LMFDI layer comprises an alloy Co—Mn—Al.

12. A hard disk drive comprising the MAMR head of claim 1.

13. A magnetic field-assisted magnetic recording (MAMR) head comprising:
    a recording main pole; and
    a seed layer and a STO positioned over the main pole, in this order in a stacking direction from a leading side to a trailing side of the recording head, wherein
    the STO comprises a field generating layer (FGL), an interlayer with fcc structure, and a spin polarized layer (SPL), in this order in the stacking direction, and
    the SPL comprises a LMFDI layer with bcc structure that directly contacts the interlayer.

14. The MAMR head of claim 13, wherein
    the LMFDI layer comprises an alloy X-Y-Z comprising element X, element Y, and element Z, wherein
    X is selected from a group consisting of Co and Fe,
    Y is selected from a group consisting of Cr, Mn, Fe, and Co, and
    Z is Al.

15. The MAMR head of claim 14, wherein
    the LMFDI layer comprises an alloy Co—Fe—Al or Co—Mn—Al.

16. The MAMR head of claim 13, wherein
    the LMFDI layer has a thickness of 7.5 to 10 Å.

17. The MAMR head of claim 13, wherein
    the SPL further comprises a Heusler layer directly contacting the LMFDI layer, the Heusler layer comprising a different material from the LMFDI layer, and the Heusler layer further comprises a magnetically unresponsive magnetic dead layer that directly contacts the LMFDI layer.

18. The MAMR head of claim 17, wherein the magnetic dead layer has a thickness of less than 5 Å.

19. The MAMR head of claim 17, wherein the Heusler layer comprises an alloy X-Y-Z comprising element X, element Y, and element Z, wherein X is selected from a group consisting of Co and Fe, Y is selected from a group consisting of Cr, Mn, Fe, and Co, and Z is selected from a group consisting of Si and Ge.

20. The MAMR head of claim 19, wherein the Heusler layer comprises an alloy Co—Mn—Ge.

21. The MAMR head of claim 13, wherein the seed layer comprises a bcc layer positioned above an hcp layer or fcc layer.

22. A hard disk drive comprising the MAMR head of claim 13.

\* \* \* \* \*